US008716168B2

(12) United States Patent
Yoo et al.

(10) Patent No.: US 8,716,168 B2
(45) Date of Patent: May 6, 2014

(54) ELECTRODE CATALYST FOR FUEL CELL, METHOD OF MANUFACTURING THE SAME, MEMBRANE ELECTRODE ASSEMBLY INCLUDING THE ELECTRODE CATALYST, AND FUEL CELL INCLUDING THE MEMBRANE ELECTRODE ASSEMBLY

(75) Inventors: Dae-jong Yoo, Seoul (KR); Kyung-jung Kwon, Yongin-si (KR); Chan-ho Pak, Seoul (KR); Victor Roev, Suwon-si (KR); Kang-hee Lee, Suwon-si (KR); Seon-ah Jin, Pocheon-si (KR)

(73) Assignee: Samsung Electronics Co., Ltd. (KR)

( * ) Notice: Subject to any disclaimer, the term of this patent is extended or adjusted under 35 U.S.C. 154(b) by 592 days.

(21) Appl. No.: 12/962,862

(22) Filed: Dec. 8, 2010

(65) Prior Publication Data
US 2011/0177425 A1 Jul. 21, 2011

(30) Foreign Application Priority Data

Jan. 15, 2010 (KR) .................. 10-2010-0003934

(51) Int. Cl.
| B01J 21/18 | (2006.01) |
| B01J 23/00 | (2006.01) |
| B01J 23/40 | (2006.01) |
| B01J 23/74 | (2006.01) |
| C22C 5/00 | (2006.01) |
| C22C 5/04 | (2006.01) |
| C22C 19/07 | (2006.01) |
| C22C 30/00 | (2006.01) |
| C01B 35/04 | (2006.01) |
| H01M 4/02 | (2006.01) |
| H01M 4/36 | (2006.01) |
| H01M 4/90 | (2006.01) |
| H01M 4/94 | (2006.01) |

(52) U.S. Cl.
USPC ........... 502/185; 502/184; 420/435; 420/461; 420/463; 420/464; 420/591; 148/430; 148/442; 429/525; 429/527

(58) Field of Classification Search
USPC .......... 502/184, 185; 420/435, 461, 463, 464, 420/591; 148/430, 442; 429/525, 527
See application file for complete search history.

(56) References Cited

U.S. PATENT DOCUMENTS 3,986,901 A * 10/1976 Plante et al. .................. 148/105
4,781,803 A * 11/1988 Harris et al. .................. 205/636
(Continued)

FOREIGN PATENT DOCUMENTS

| JP | 2007-122934 | 5/2007 |
| JP | 2008-243756 | 10/2008 |

(Continued)

OTHER PUBLICATIONS

"The effect of heat treatment on nanoparticle size and OPR activity for carbon-supported Pd-Co alloy electrocatalysts," Lei Zhang et al. Electrochimica Acta 52 (2007), pp. 3088-3094.*

(Continued)

*Primary Examiner* — Patricia L Hailey
(74) *Attorney, Agent, or Firm* — Cantor Colburn LLP

(57) ABSTRACT

Electrode catalysts for fuel cells, a method of manufacturing the same, a membrane electrode assembly (MEA) including the same, and a fuel cell including the MEA are provided. The electrode catalysts include a first catalyst alloy containing palladium (Pd), cobalt (Co), and phosphorus (P), a second catalyst alloy containing palladium (Pd) and phosphorus (P), and a carbon-based support to support the catalysts.

8 Claims, 7 Drawing Sheets

(56) References Cited

U.S. PATENT DOCUMENTS

| | | | |
|---|---|---|---|
| 6,623,566 B1 * | 9/2003 | Senkov et al. | 148/121 |
| 7,498,286 B2 * | 3/2009 | Manthiram et al. | 502/101 |
| 7,540,929 B2 * | 6/2009 | Demetriou et al. | 148/403 |
| 8,338,051 B2 * | 12/2012 | Takahashi et al. | 429/482 |
| 8,367,266 B2 * | 2/2013 | Harkness et al. | 429/483 |
| 2006/0177728 A1 | 8/2006 | Adzic et al. | |
| 2008/0135136 A1 * | 6/2008 | Demetriou et al. | 148/403 |

FOREIGN PATENT DOCUMENTS

| | | | | |
|---|---|---|---|---|
| KR | 10-2007-01008 46 | * | 10/2007 | H01M 4/90 |
| KR | 10-2007-0100846 | | 10/2007 | |
| KR | 10-2008-0037526 | | 4/2008 | |

OTHER PUBLICATIONS

"Preparation of carbon-supported Pd-P. catalyst with high content of element phosphorus and its electrocatalytic performance for formic acid oxidation," Gaixiu Yang et al. Electrochemistry Communications 12 (2010), pp. 492-495.*

"Carbon-supported Pd nanocatalyst modified by non-metal phosphorus for the oxygen reduction reaction," Lifeng Cheng et al. Journal of Power Sources 182 (2008), pp. 91-94.*

"Development of PdP nano electrocatalysts for oxygen reduction reaction," Rosa Rego et al. Electrochimica Acta 87 (2013), pp. 73-81.*

H. Liu et al., "Factors influencing the electrocatalytic activity of Pd100-x(0<x<50) nanoalloys for oxygen reduction reaction in fuels cells," Applied Catalysis B: Envirnmental, 2009, vol. 90, pg. 184-194.

Lingling Zhang et al., "A carbon-suported PD-P. catalyst as the anodic catalyst in a direct formic acid fuel cell," Journal of Power Sources, 2006, vol. 162, pg. 177-179.

L. Xiong et al., "Effect of Atomic Ordering on the Catalytic Activity of Carbon Supported PtM (M=Fe, Co, Ni, and Cu0 Alloys for Oxygen Reduction in PEMFCs," Journal of the Electrochemical Society, 2005, vol. 152, No. 4, p. A697-A703.

* cited by examiner

ELECTRODE CATALYST FOR FUEL CELL, METHOD OF MANUFACTURING THE SAME, MEMBRANE ELECTRODE ASSEMBLY INCLUDING THE ELECTRODE CATALYST, AND FUEL CELL INCLUDING THE MEMBRANE ELECTRODE ASSEMBLY

CROSS-REFERENCE TO RELATED APPLICATION

This application claims the benefit of Korean Patent Application No. 10-2010-0003934, filed on Jan. 15, 2010, in the Korean Intellectual Property Office, the disclosure of which is incorporated herein, by reference.

BACKGROUND

1. Field

The present disclosure relates to non-platinum (Pt) based electrode catalysts for fuel cells, methods of manufacturing the same, membrane electrode assemblies (MEAs), and fuel cells using the non-Pt based electrode catalysts.

2. Description of the Related Art

Fuel cells can be classified as polymer electrolyte membrane fuel cells (PEMFCs), direct methanol fuel cells (DMFCs), phosphoric acid fuel cells (PAFCs), molten carbonate fuel cells (MCFCs), or solid oxide fuel cells (SOFCs), according to the type of electrolyte and fuel used in the fuel cells. In general, PEMFCs and DMFCs include a membrane electrode assembly (MEA) consisting of an anode, a cathode, and a polymer electrolyte membrane interposed between the anode and the cathode. A catalyst that facilitates a reaction for generating hydrogen ions by oxidizing fuel is used in the anodes of fuel cells, and a catalyst that facilitates the reduction of oxygen is used in the cathodes.

In general, a catalyst including platinum (Pt) as an active component is used in the anodes and the cathodes. However, platinum is a high-priced precious metal. For mass production and commercialization of fuel cells, a large amount of platinum is used in the electrode catalysts, and thus, the costs of fuel cells should be reduced. Therefore, development of non-Pt based catalysts and research into developing fuel cells having excellent performance, by applying the non-Pt based catalysts, is being conducted.

SUMMARY

Provided are non-platinum (Pt) based electrode catalysts for fuel cells, having excellent dispersion and oxygen reduction reaction (ORR) characteristics.

Provided are methods of manufacturing the electrode catalysts.

Provided are membrane electrode assemblies (MEAs) for fuel cells including the electrode catalysts.

Provided are fuel cells including the MEAs.

According to an aspect of the present invention, an electrode catalyst for fuel cells includes a carbon-based support; and catalytic particles supported by the carbon-based support, wherein the catalytic particles include: a first catalyst alloy containing palladium (Pd), cobalt (Co), and phosphorus (P); and a second catalyst alloy containing palladium (Pd) and phosphorus (P).

According to another aspect of the present invention, a method of manufacturing the electrode catalyst for fuel cells preparing a mixture including palladium (Pd) precursor and a carbon-based support loaded with a first catalyst alloy containing palladium (Pd), cobalt (Co), and phosphorus (P); adding a phosphorus (P) precursor to the mixture; and reducing the resultant.

According to another aspect of the present invention, a membrane-electrode assembly (MEA) includes a cathode including the electrode catalyst; an anode disposed to face the cathode; and an electrolyte membrane interposed between the cathode and the anode.

According to another aspect of the present invention, a fuel cell includes the MEA.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Figure 1:
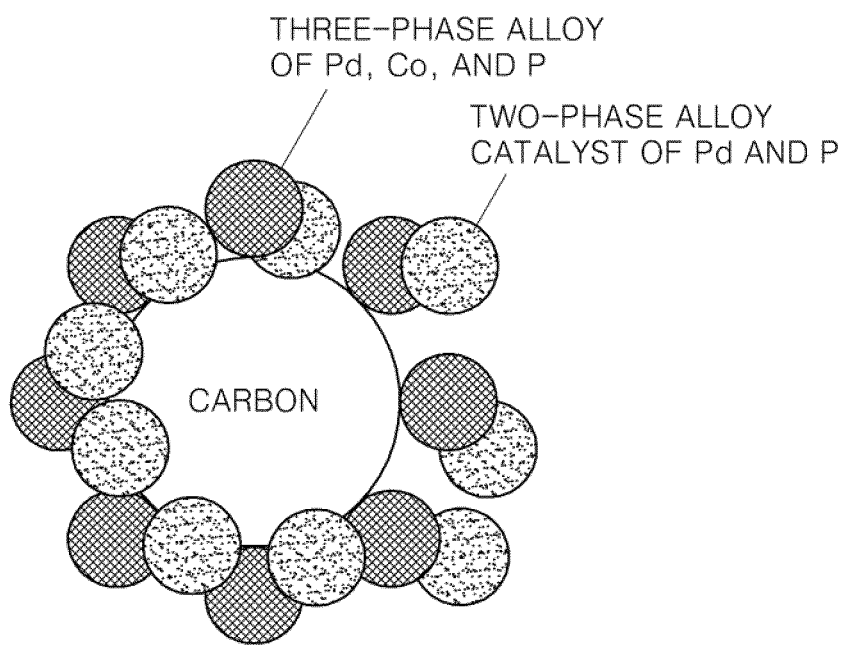
FIG. 1 is a diagram schematically illustrating an electrode catalyst for fuel cells, according to an embodiment of the present invention.

Reference will now be made in detail to the exemplary embodiments of the present invention, examples of which are illustrated in the accompanying drawings, wherein like reference numerals refer to the like elements throughout. The exemplary embodiments are described below, in order to explain the aspects of the present invention, by referring to the figures.

A conventional fuel cell generally includes platinum (Pt) catalytic layers disposed on an anode and a cathode, respectively, and a solid polymer membrane interposed between the Pt catalytic layers. The following reaction occurs in the anode, due to the Pt catalytic layer.

$$H_2 \rightarrow 2H^+ + 2e^-$$

The H+ generated during the reaction is diffused. The following oxygen reduction reaction (ORR) occurs in the cathode, due to the Pt catalytic layer.

$$2H^+ + 2e^- + \tfrac{1}{2}O_2 \rightarrow H_2O$$

In an electrode catalyst according to an exemplary embodiment of the present invention, a first catalyst alloy containing palladium (Pd), cobalt (Co), and phosphorus (P), and a second catalyst alloy containing palladium (Pd) and phosphorus (P) are used as catalytic particles, instead of a general Pt catalyst, so that polymer electrolyte membrane fuel cells (PEMFCs), phosphoric acid fuel cells (PAFCs), and direct methanol fuel cells (DMFCs), having improved electrode catalytic activity and in particular, improved ORR speeds, may be provided.

FIG. 1 is a diagram schematically illustrating an electrode catalyst for fuel cells, according to an exemplary embodiment of the present invention. Referring to FIG. 1, a first catalyst alloy containing palladium (Pd), cobalt (Co), and phosphorus (P), and a second catalyst alloy containing palladium (Pd) and phosphorus (P), are uniformly supported on carbon-based support. The first catalyst alloy and the second catalyst alloy are in the form of particles disposed adjacent to each other.

In general, catalytic activity may be improved chemically and/or physically. In a chemical method, an ORR of a catalyst is improved by forming a cobalt (Co) alloy, in order to change the electron density of palladium (Pd). However, in order to increase a degree of alloying, a high-temperature thermal treatment conducted at about 600 to about 900° C. is needed, and the loading yield against the support is low, so that it is difficult to apply a chemical method to fuel cells.

In a physical method, a non-metal material such as phosphorus (P) is added to palladium (Pd), so that catalytic particles are uniformly distributed to the carbon-based support, thereby improving the specific surface area of the catalytic particles and increasing the catalytic activity thereof. However, the chemical activity of the catalyst does not change. Thus, there is a need to improve electrochemical activity, by alloying cobalt (Co) with palladium (Pd), and to increase the onset potential of the catalyst, by adding phosphorus (P) to palladium (Pd) and increasing the dispersion thereof.

In the exemplary electrode catalyst, the first catalyst alloy containing palladium (Pd), cobalt (Co), and phosphorus (P), and the second catalyst alloy containing palladium (Pd) and phosphorus (P) are combined into single particles, so that the loading yield of the catalytic particles is high, dispersion is excellent, ORR activity is excellent. Thus, the activity of the electrode catalyst, when used as a cathode catalyst of a fuel cell, is high. This is because the catalytic particles supported by the carbon-based support have excellent oxygen reduction capability, as compared with an alloy prepared by adding cobalt or phosphorus independently to palladium.

The support used in the electrode catalyst may be electrically conductive and may be, for example, a carbon-based support. Examples of the carbon-based support include ketjen black, carbon black, graphite carbon, carbon nanotubes, carbon fiber, and a combination thereof. However, the present invention is not limited thereto.

In the electrode catalyst, the first catalyst alloy contains palladium (Pd), cobalt (Co), and phosphorus (P). Thus, the electron density of palladium (Pd) is changed, so that catalytic activity increases, and the dispersion of the catalyst may be improved, by using the phosphorus (P).

The amount of cobalt in the first catalyst alloy may be in the range of about 2 to about 13 weight %, for example, about 3.5 to about 9.0 weight %, based on the total weight of the first catalyst alloy. The amount of phosphorus in the first catalyst alloy may be in the range of about 0.1 to 1.5 weight %, for example, about 0.2 to about 1 weight %, based on the total weight of the first catalyst alloy. When the amounts of cobalt and phosphorus are within the above ranges, the ORR activity of fuel cells using the electrode catalyst may be improved.

In the electrode catalyst, the second catalyst alloy contains palladium (Pd) and phosphorus (P). Thus, an onset potential of the second electrode catalyst is improved. The first catalyst alloy may increase the entire ORR activity through the inclusion of cobalt (Co) particles; however, the onset potential may be reduced. Such a problem may be resolved by including the second catalyst alloy.

The amount of phosphorus in the second catalyst alloy may be in the range of about 0.2 to about 1.5 weight %, for example, 0.2 to about 1 weight %, based on the total weight of the second catalyst alloy. The amount of the second catalyst alloy may be in the range of about 20 to about 80 weight %, for example, about 30 to about 70 weight %, based on the total weight of the catalytic particles. When the amounts of second catalyst alloy and each element therein are in the above ranges, an onset voltage of the ORR in a fuel cell including the electrode catalyst may be improved.

In order to improve ORR activity, the first catalyst alloy and/or the second catalyst alloy may further include at least one selected from the group consisting of iridium (Ir) and copper (Cu). More specifically, the second catalyst alloy may further include at least one selected from the group consisting of iridium (Ir) and copper (Cu).

The amount of catalytic particles may be in the range of about 20 to about 70 weight %, for example, about 35 to about 55 weight %, based on the total weight of the electrode catalyst. In the above range, electrode catalytic activity is excellent. The high loading yield of the catalytic particles may be identified through inductively coupled plasma (ICP) analysis.

Hereinafter, a method of manufacturing an electrode catalyst for fuel cells, according to another exemplary embodiment of the present invention, will be described in more detail. The electrode catalyst may be manufactured by using a polyol process. For example, the electrode catalyst may be manufactured using a method including: preparing a mixture including a palladium (Pd) precursor and a carbon-based support loaded with the first catalyst alloy; adding a phosphorus (P) precursor to the mixture; and reducing the resultant mixture.

Figure 2:
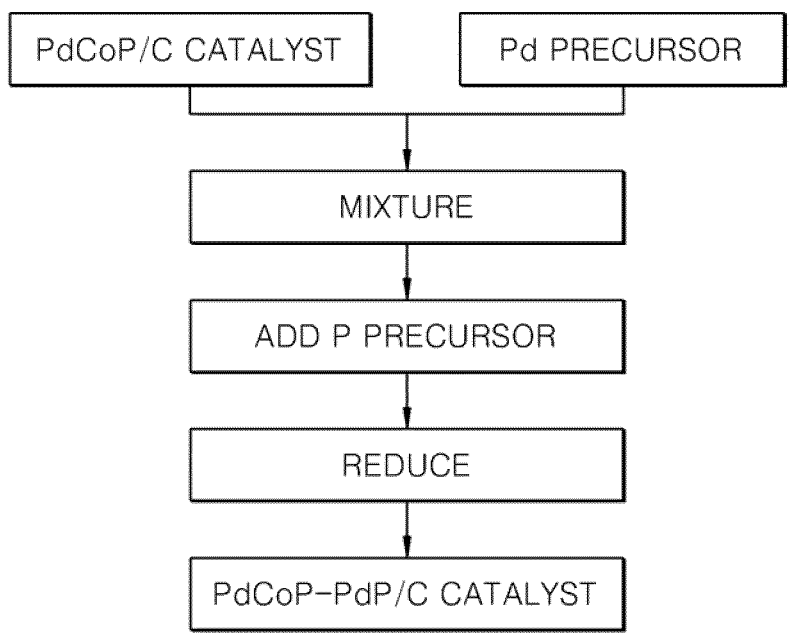
FIG. 2 is a flowchart illustrating a method of manufacturing the electrode catalyst of FIG. 1, according to an embodiment of the present invention.

FIG. 2 is a flowchart illustrating a method of manufacturing the electrode catalyst of FIG. 1, according to an exemplary embodiment of the present invention. Referring to FIG. 2, a mixture, including a carbon-based support loaded with the first catalyst alloy, a solvent, and a palladium (Pd) precursor, is prepared.

The first catalyst alloy is supported by the carbon-based support. In order to improve the ORR activity, the first catalyst alloy may further include at least one selected from the group consisting of iridium (Ir) and copper (Cu).

The amount of the carbon-based support in the mixture may be in the range of about 40 to about 400 parts by weight, based on 100 parts by weight of the palladium component of the palladium precursor. Examples of the palladium precursor include, but are not limited to, palladium chlorides, nitrides, cyanates, sulfides, bromides, nitrates, acetates, and sulfates.

The solvent may be an organic solvent. Examples of an organic solvent, which may dissolve the carbon-based support include, but are not limited to: glycol-based organic solvents such as ethylene glycol, 1,2-propylene glycol, 1,3-butanediol, 1,4-butanediol, neopentyl glycol, diethylene glycol, 3-methyl-1,5-pentanediol, 1,6-hexanediol, and trimethyol propane; and alcohol-based organic solvents such as ethanol, propanol, and butanol. Any organic solvent that can dissolve the carbon-based support and the palladium may be used. The amount of the organic solvent may be in the range of about 15,000 to about 35,000 parts by weight, based on 100 parts by weight of the palladium precursor. When the amount of the solvent is within the above range, the elements of the mixture may be uniformly dispersed and mixed. Here, each element may be dispersed in the organic solvent and then mixed.

According the current embodiment, the mixture may be prepared by adding a phosphorus (P) precursor to a mixture including the carbon-based support, a palladium (Pd) precursor, and a cobalt (Co) precursor; reducing the resultant mixture; and mixing additional palladium (Pd) precursor with the reduced resultant. For convenience of description, the preparing of the mixture will be described later.

Then, a phosphorus precursor is added to the reduced resultant, which is then itself reduced, so that the second catalyst alloy containing palladium (Pd) and phosphorus (P) may be loaded on the carbon-based support.

Before adding the phosphorus precursor to the mixture, the pH of the mixture may be adjusted. Here, the pH may be adjusted from about 10 to about 12. Under such basic conditions, a palladium precursor is converted into palladium ions having a hydroxyl group (—OH), and the palladium ions are loaded on the carbon-based support. Then, phosphorus is added to the mixture and is reduced, so that the first and second catalyst alloys may be uniformly supported by the carbon-based support.

Examples of the phosphorus precursor include, but are not limited to, chlorides, nitrides, cyanates, sulfides, bromides, nitrates, acetates, and sulfates, which include phosphorus. In the phosphorus precursor, the amount of phosphorus component may be in the range of about 0.1 to about 5 parts by weight, based on 100 parts by weight of the palladium in the palladium precursor.

The reduction may be performed by, for example, adding a reducing agent to the mixture to which the phosphorus precursor is added. The resultant mixture may be heated with microwaves and/or using an autoclave.

The reducing agent may be hydrazine ($NH_2NH_2$), sodium borohydride ($NaBH_4$), or formic acid. The amount of the reducing agent may be in a range of about 3 to about 5 mol, based on 1 mol of the palladium precursor. Here, if the amount of the reducing agent is within the above range, the reactivity of reduction reaction is excellent.

During the reduction, a catalyst alloy having a high degree of alloying may be formed, by performing the reduction reaction at a high pressure, using microwaves and/or an autoclave. In order to reduce the reaction time, a microwave-autoclave combined method may be applied. More specifically, microwaves may be used in the reduction, for performing a high voltage reaction at a lower temperature.

In a catalyst alloy manufactured at a high pressure using microwaves and/or an autoclave, the degree of alloying is high, the loading yield is high, and particle sizes are small, since a thermal treatment at a high temperature is not performed. Thus, the ORR speed of fuel cells may be improved.

More specifically, a phosphorus precursor and a reducing agent are added to the mixture including the palladium precursor and the carbon-based support loaded with the first catalyst alloy, and the resultant mixture is put in a microwave reactor, to which a temperature sensor and a pressure sensor are attached. Then, microwaves are radiated in the microwave reactor. A reduction reaction may be performed in the microwave reactor, at temperature in the range of about 60 to about 300° C. and at a pressure in the range of about 0 to about 200 psi.

According to an exemplary embodiment, in order to uniformly reduce the precursor materials in the presence of the reducing agent and thereby form particles, the resultant mixture may be maintained at a temperature of about 60 to about 90° C., for about 0.5 to about 2 hours. Then, the temperature is increased to about 100 to about 300° C., for example, 200 to about 270° C., and the pressure is adjusted to about 50 to about 200 psi, for example, 70 to about 100 psi. The reduction reaction may be performed under such temperature and pressure conditions for about 0.5 to about 2 hours. Accordingly, the precursor materials are reduced and an alloy of palladium and phosphorus is formed.

In the above-manufactured electrode catalyst, the first and second catalyst alloys are uniformly loaded on the carbon-based support. Accordingly, the degree of alloying and dispersion are high, and the ORR is excellent, as compared with that of a general catalyst.

According to an exemplary embodiment of the present invention, the method of manufacturing the electrode catalyst may include: adding a phosphorus (P) precursor to a mixture including a carbon-based support, a palladium (Pd) precursor, and a cobalt (Co) precursor, reducing the resultant mixture; and mixing a palladium (Pd) precursor with the reduced resultant.

Examples of the carbon-based support may include ketjen black, carbon black, graphite carbon, carbon nanotubes, and carbon fiber. The amount of the carbon-based support may be in the range of about 25 to about 400 parts by weight, based on 100 parts by weight of the palladium in the palladium precursor.

Examples of the cobalt precursor include, but are not limited to, chlorides, nitrides, cyanates, sulfides, bromides, nitrates, acetates, and sulfates, which include cobalt. The amount of the cobalt precursor may be in a range of about 4 to about 40 parts by weight, based on 100 parts by weight of the palladium in the palladium precursor. The organic solvent that may dissolve the carbon-based support and the precursor materials is described above.

The phosphorus (P) precursor is added to the mixture including the carbon-based support, the palladium (Pd) precursor, and the cobalt (Co) precursor, and as a reduction reaction is performed, the first catalyst alloy may be formed on the carbon-based support. The pH of the mixture may be adjusted before adding the phosphorus precursor to the mixture. Here, the pH is adjusted to from about 10 to about 12. Under such basic conditions, the palladium precursor and the cobalt precursor are converted into metal ions having a hydroxyl group (—OH), and palladium and cobalt ions having the hydroxyl groups (—OH) are loaded on the carbon-based support. Then, the phosphorus is reduced and loaded on the carbon-based support, so that the first catalyst alloy may be uniformly formed on the carbon-based support.

The reduction may be performed by adding a reducing agent and radiating the resultant with microwaves, and/or using an autoclave. The types of the reducing agent and the conditions for the reduction reaction are described above. As the palladium precursor is mixed with the reduced resultant, the mixture including the carbon-based support loaded with the first catalyst alloy and the palladium (Pd) precursor is prepared, for manufacturing the electrode catalyst for fuel cells.

According to another exemplary embodiment of the present invention, a membrane electrode assembly (MEA) for fuel cells includes a cathode, an anode, and an electrolyte membrane interposed between the anode and the cathode. The cathode and the anode face each other, and the cathode includes the electrode catalyst.

According to another exemplary embodiment of the present invention, a fuel cell including the MEA is provided. Separators may be stacked upon one another at both sides of the MEA. The fuel cell may be, for example, a polymer electrolyte membrane fuel cell (PEMFC), a phosphoric acid fuel cell (PAFC), or a direct methanol fuel cell (DMFC).

Hereinafter, one or more exemplary embodiments of the present invention will be described with reference to the following examples. These examples are presented for illustrative purposes only and are not intended to limit the scope of the present invention.

EXAMPLE 1

0.5 g of ketjen black was dispersed in 200 g of ethylene glycol to prepare a dispersion. 1.0194 g of tetraamine palladium (III) chloride ($Pd(NH_3)_4Cl_2 \cdot H_2O$) and 0.3218 g of $CoCl_2 \cdot 6H_2O$ previously dissolved in 40 g of ethylene glycol were added to the dispersion, and the resultant mixture was stirred for about 30 minutes. The pH of the stirred mixture was adjusted to about 11, using 1 M of NaOH dissolved in ethylene glycol. Then, 2.2483 g of 5 wt % $H_2NaPO_2 \cdot H_2O$ was added to the mixture, which was stirred for about 30 minutes. 1.2 g of hydrazine was added to the mixture, and the resultant mixture was put in a microwave reactor where a reduction reaction was performed. A temperature sensor and a pressure sensor were attached to the microwave reactor. The temperature was increased from room temperature to 90° C. for about 35 minutes, and then maintained for about 1 hour. The temperature was increased to 250° C. for about 35 minutes and then, maintained for about 1 hour. The pressure at a temperature of around 250° C. was about 100 psi. When the reaction was completed, the reduced resultant was washed about 3 or 4 times and the dried using a freeze dryer, thereby obtaining a 30 wt % PdCoP/C catalyst.

0.308 g of the obtained PdCoP/C catalyst was dispersed in 75 g of ethylene glycol. 0.278 g of tetraamine palladium (III) chloride ($Pd(NH_3)_4Cl_2 \cdot H_2O$) previously dissolved in 15 g of ethylene glycol was added to the dispersion, which was stirred for about 30 minutes. The pH of the stirred mixture was adjusted in the same manner as above. 0.310 g of 5 wt % $H_2NaPO_2 \cdot H_2O$ was added to the stirred mixture and mixed for about 30 minutes. Then, 0.45 g of hydrazine was added to the mixture, and the mixture was put in a microwave reactor, where a reduction reaction occurred in the same manner as above. When the reduction reaction was completed, the reduced resultant was washed for about 3 to about 4 times and the dried using a freeze dryer, thereby obtaining a 50 wt % PdCoP—PdP/C catalyst.

EXAMPLE 2

A 50 wt % PdCoP—PdP/C catalyst was manufactured in the same manner as in Example 1, except that 0.723 g of $H_2NaPO_2 \cdot H_2O$ was additionally added.

COMPARATIVE EXAMPLE 1 (PdP/C)

0.2 g of ketjen black was dispersed in 100 g of ethylene glycol to prepare a dispersion. 0.591 g of tetraamine palladium (III) chloride ($Pd(NH_3)_4Cl_2 \cdot H_2O$) was added to the dispersion, which was stirred for about 30 minutes. The pH of the stirred mixture was adjusted to 11, by using 1 M of NaOH dissolved in ethylene glycol and 1.54 g of 5 wt $H_2NaPO_2 \cdot H_2O$ was added to the mixture, which was stirred for about 30 minutes. 0.48 g of hydrazine was added to the mixture and the mixture was subjected to a reduction reaction using a microwave reactor. Then, the reacted resultant was filtered and washed, thereby obtaining a 50 wt % PdP/C catalyst.

COMPARATIVE EXAMPLE 2 (PdCo/C)

0.2 g of ketjen black was dispersed in 100 g of ethylene glycol to prepare a dispersion. 0.498 g of tetraamine palladium (III) chloride ($Pd(NH_3)_4Cl_2 \cdot H_2O$) and 0.157 g of $CoCl_2 \cdot 6H_2O$ were added to the dispersion, which was stirred for about 30 minutes. Then, 0.48 g of hydrazine was added to the mixture and the mixture was subjected to a reduction reaction using a microwave reactor. Then, the reacted resultant was filtered and washed, thereby obtaining a 50 wt % PdCo/C catalyst.

COMPARATIVE EXAMPLE 3 (PdCoP/C)

A 50 wt % PdCoP/C catalyst was manufactured in the same manner as in Comparative Example 1, except that 0.498 g of tetraamine palladium (III) chloride ($Pd(NH_3)_4Cl_2 \cdot H_2O$) and 0.157 g of $CoCl_2 \cdot 6H_2O$ that were previously dissolved in ethylene glycol were used after dispersing the ketjen black in ethylene glycol.

Figure 3:
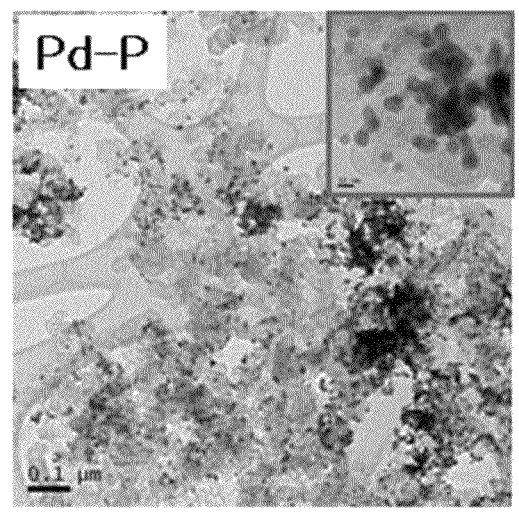
FIG. 3 is a transmission electrode microscopic (TEM) image of a catalyst manufactured in Comparative Example 1.
Figure 4:
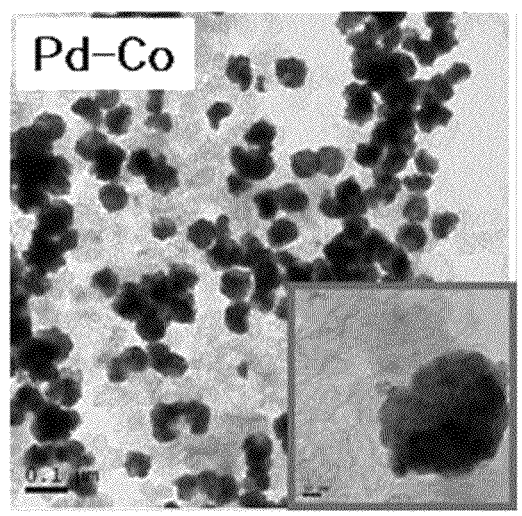
FIG. 4 is a TEM image of a catalyst manufactured in Comparative Example 2.
Figure 5:
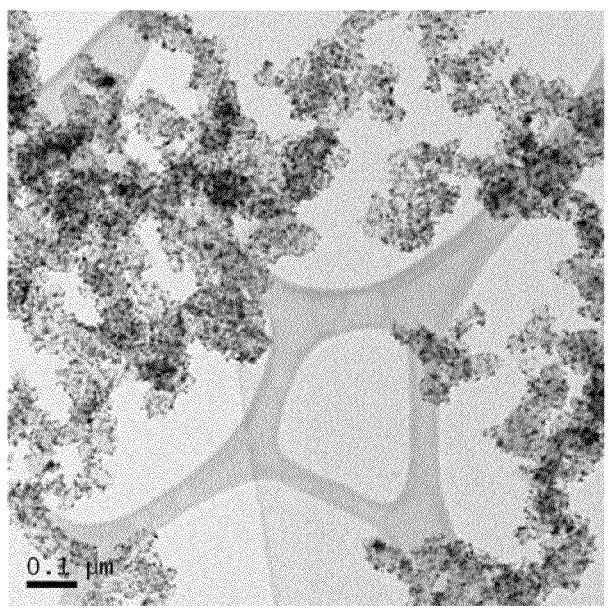
FIG. 5 is a TEM image of a catalyst manufactured in Comparative Example 3.
Figure 6:
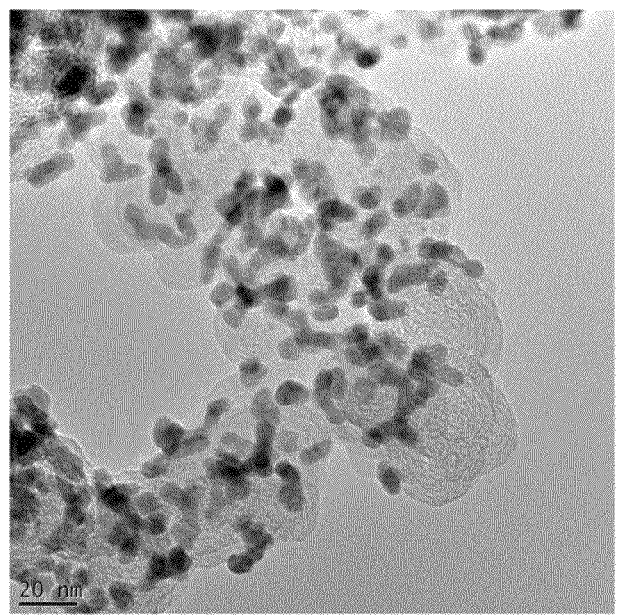
FIG. 6 is a TEM image of a catalyst manufactured in Example 1.

Transmission electrode microscopic (TEM) images of the electrode catalyst manufactured in Example 1 and Comparative Examples 1 through 3 are illustrated in FIGS. 3 through 6. FIG. 3 is a TEM image of the PdP/C catalyst manufactured in Comparative Example 3, FIG. 4 is a TEM image of the PdCo/C catalyst manufactured in Comparative Example 2, FIG. 5 is a TEM image of the PdCoP/C catalyst manufactured in Comparative Example 3, and FIG. 6 is a TEM image of the PdCoP—PdP/C catalyst manufactured in Example 1.

As illustrated in FIGS. 3 through 6, the PdCoP—PdP/C catalyst manufactured in Example 1 has a smaller particle size and a higher dispersion than the PdP/C catalyst, the PdCo/C catalyst, and the PdCoP/C catalyst manufactured in Comparative Examples 1 through 3.

Figure 7:
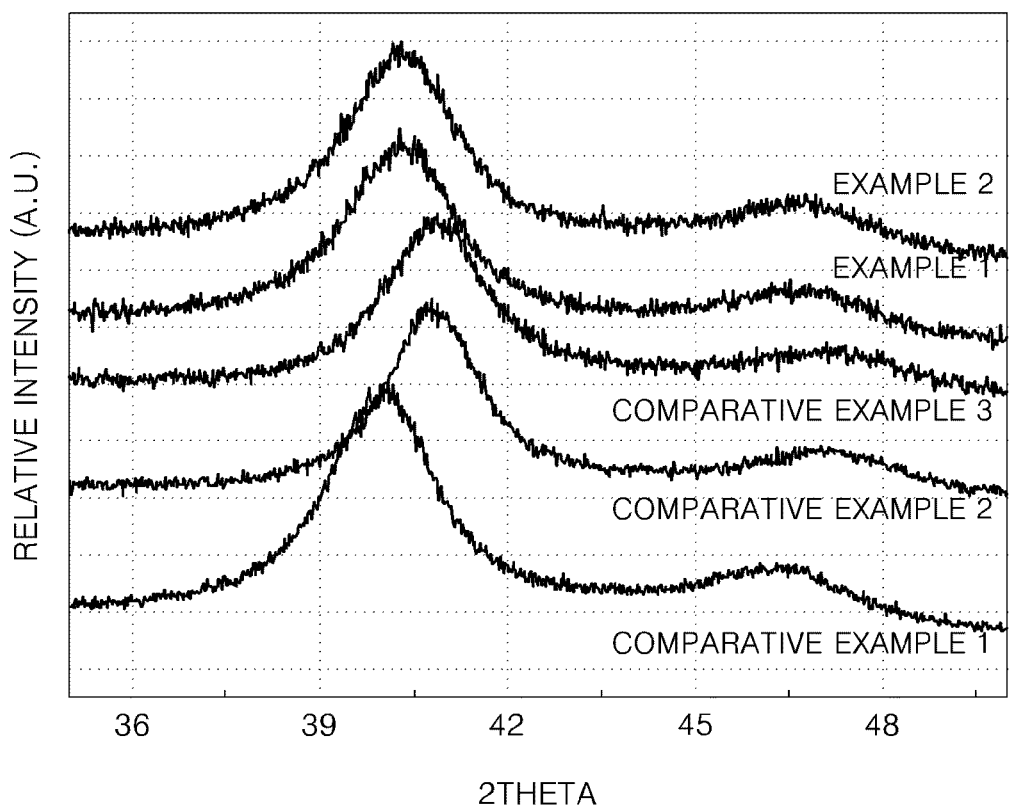
FIG. 7 is a graph showing results of X-ray diffraction (XRD) analysis for catalysts manufactured in Examples 1-2 and Comparative Examples 1-3.

These results are also shown using X-ray diffraction (XRD) analysis. Graphs showing the results of XRD analysis for the electrode catalysts manufactured in Examples 1-2 and Comparative Examples 1 through 3 are shown in FIG. 7. The results of XRD analysis are also illustrated in Table 1.

Referring to FIG. 7 and Table 1, the particle sizes (average diameter of the particles) of the PdCoP—PdP/C catalysts manufactured in Examples 1 and 2 are 3.68 nm and 3.70 nm, respectively. Thus, the PdCoP—PdP/C catalysts are smaller than the electrode catalysts manufactured in Comparative Examples 1 through 3, and peaks of the PdCoP—PdP/C catalysts manufactured in Examples 1 and 2 exist between Comparative Example 1 (PdP/C catalyst) and Comparative Example 3 (PdP/C catalyst). This represents that an alloy of the catalyst that relates to activity of particles is well formed.

Composition of the electrode catalysts manufactured in Example 1 and Comparative Examples 1 through 3 is analyzed using inductively coupled plasma (ICP) and the results are also shown in Table 1.

TABLE 1

| | XRD Results | | ICP Analysis (wt %) | | | | |
| | | | $1^{st}$ catalyst loading | | | $2^{nd}$ catalyst loading | |
| | Crystalline size (nm) | 2 theta (111 peak) | P | Co | Pd | P | Pd |
|---|---|---|---|---|---|---|---|
| Comparative Example 1 (PdP/C) | 4.61 | 39.4172 | 0.43 | 0.00 | 40.93 | — | — |
| Comparative Example 2 (PdCo/C) | 4.57 | 40.8334 | 0.00 | 6.68 | 40.01 | — | — |
| Comparative Example 3 (PdCoP/C) | 4.01 | 40.8772 | 0.42 | 7.76 | 37.42 | — | — |

TABLE 1-continued

| | XRD Results | | ICP Analysis (wt %) | | | | |
| --- | --- | --- | --- | --- | --- | --- | --- |
| | | | 1st catalyst loading | | | 2nd catalyst loading | |
| | Crystalline size (nm) | 2 theta (111 peak) | P | Co | Pd | P | Pd |
| Example 1 (PdCoP-PdP/C) | 3.68 | 40.3000 | 0.34 | 3.6 | 22.74 | 0.14 | 25.17 |
| Example 2 (PdCoP-PdP/C) | 3.70 | 40.3074 | 0.52 | 3.53 | 22.29 | 0.83 | 25.94 |

Measurement of Cyclic Voltammetry and ORR

Working electrodes were manufactured by using the electrode catalysts manufactured in Examples 1-2 and Comparative Examples 1 through 3 and the voltammetry and ORR were analyzed for the electrodes.

0.02 g of the electrode catalysts manufactured in Examples 1-2 and Comparative Examples 1 through 3 were respectively dispersed in 10 g of ethylene glycol and 15 µl of the electrode catalysts dispersed in ethylene glycol were dropped to a carbon rotating electrode (glassy carbon) using a micropipette and then dried under reduced pressure, at a temperature of 80° C. Then, 15 µl of a 5 wt % Nafion solution dissolved in ethylene glycol was dropped to the electrodes including the catalysts. The resultant was dried using the same process, thereby preparing working electrodes.

The working electrodes were installed in a RDE device, and a platinum wire, as a counter electrode, and Ag/AgCl (KCl$_{sat}$), as a reference electrode, were prepared. The prepared three-phase electrode was put in a 0.1M HClO$_4$ electrolyte and bubbled for about 30 minutes using nitrogen, so that remaining oxygen in a solution was removed. Cyclic voltammetry was performed in the range of about 0.03 to about 1.2V (vs. NHE), by using a potentiostat/galvanostat and hydrogen desorption of the electrode catalysts was obtained. The mass activity values (A/g) were obtained by dividing the currents in the Examples and Comparative Examples by the weight of palladium, which is the precious metal catalyst.

Figure 8:
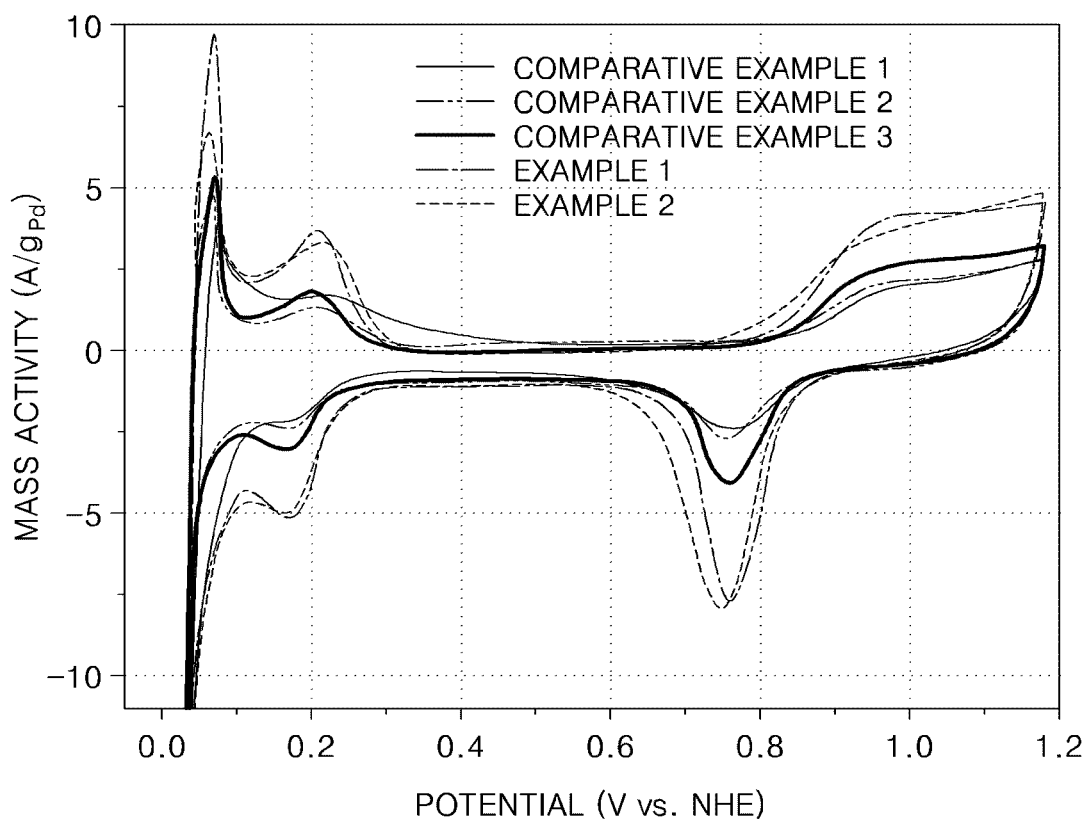
FIG. 8 is a graph showing characteristics of a cyclic voltage diagram of half cells using the catalysts manufactured in Examples 1-2 and Comparative Examples 1-3.

The hydrogen desorption in the electrode catalyst is the adsorbed amount of hydrogen ions in the electrode and indicates an electrochemical specific surface area. Referring to FIG. 8, the electrochemical specific surface area of the PdCoP—PdP/C catalysts manufactured in Examples 1 and 2 are larger than those of the PdP/C catalyst, the PdCo/C catalyst, and the PdCoP/C catalyst manufactured in Comparative Examples 1 through 3. The mass activity values (A/g) are illustrated in Table 2.

Then, oxygen was saturated and dissolved in an electrolytic solution. Next, while the carbon electrodes were rotated, ORR currents were recorded in a negative direction, from an open circuit voltage (OCV) to a potential (0.4-0.6 V vs. NHE), where a material limiting current occurs. The catalytic activity was compared using a difference in the ORR current, at a voltage of 0.8V or 0.75V vs. NHE.

Figure 9:
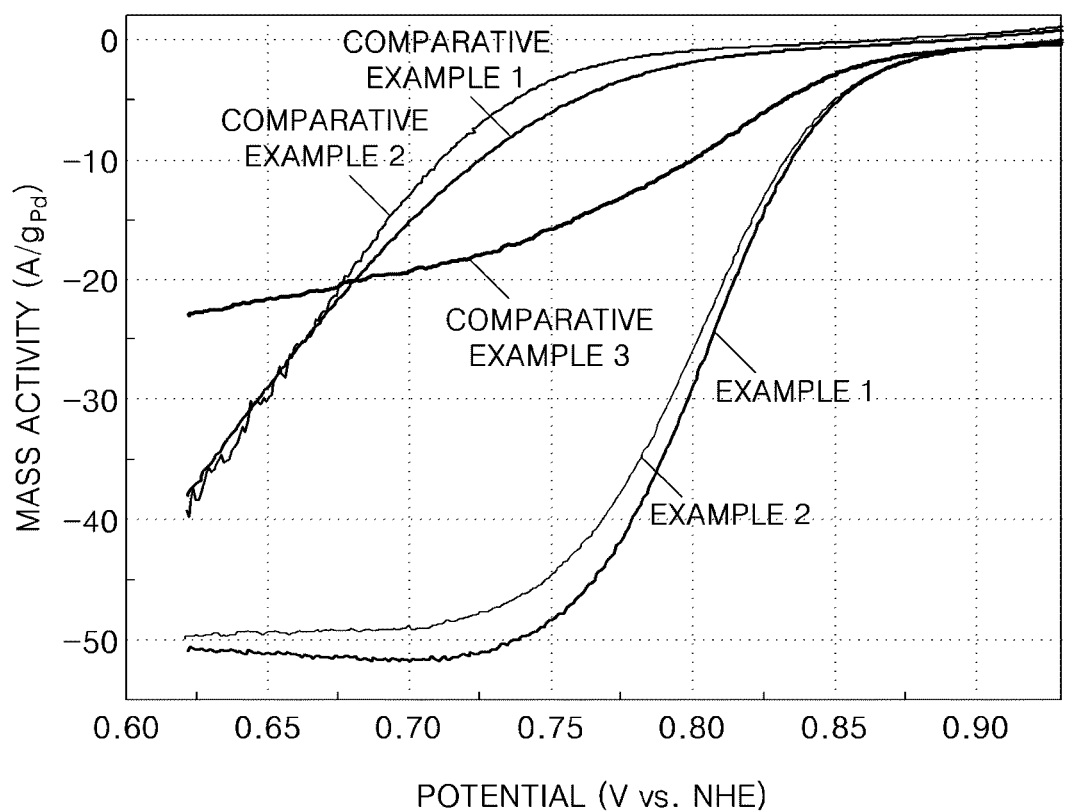
FIG. 9 is a graph showing oxygen reduction activities of half cells using the catalysts manufactured in Examples 1-2 and Comparative Examples 1-3.

Referring to FIG. 9, the ORR and onset potentials are significantly improved when the electrode catalysts manufactured in Examples 1-2 are used. The results are shown in Table 2.

TABLE 2

| | | Mass activity (A/g$_{Pd}$) | | |
| --- | --- | --- | --- | --- |
| | Q/g$_{Pd}$ (A·V/g$_{Pd}$) | 0.75 V | 0.8 V | Onset Potential (V) |
| Comparative Example 1 (PdP) | 0.597 | −14.09 | −4.99 | 0.902 |
| Comparative Example 2 (PdCo) | 0.357 | −2.89 | −0.79 | 0.878 |
| Comparative Example 3 (PdCoP) | 0.388 | −15.83 | −9.82 | 0.890 |
| Example 1 (PdCoP—PdP-1) | 0.765 | −44.40 | −25.47 | 0.937 |
| Example 2 (PdCoP—PdP-2) | 0.740 | −48.36 | −28.71 | 0.931 |

Test for Single Cell at High Temperature: Evaluation of Current Voltage Characteristics Fuel cells were manufactured as follows, using electrode catalysts manufactured in Example 2 and Comparative Examples 2-3, and current voltage characteristics thereof were evaluated.

1 g of the electrode catalysts manufactured in Example 2 and Comparative Examples 2-3, 0.03 g of poly vinylidene fluoride (PVDF), and an appropriate amount of solvent NMP were mixed to prepare a slurry. The slurry was coated on a carbon paper, on which a microporous layer is coated, by using a bar coater and a drying process was performed on the carbon paper, by gradually increasing the temperature from room temperature to 150° C., thereby manufacturing a cathode. A loading amount of the electrode catalyst on the cathode was about 1.5 to about 2.0 mg/cm$^2$.

Moreover, a PtRu/C catalyst was used to prepare an anode. A loading amount of the PtRu/C catalyst on the anode was about 0.8 mg/cm$^2$. Then t-PBOA, which was doped with 85 weight % of phosphoric acid, was used as an electrolyte membrane interposed between the cathode and the anode, thereby preparing a MEA.

Then, non-humidified air for the cathode and non-humidified hydrogen for the anode were supplied to the MEA. The performance of the MEA was evaluated at a temperature of about 150° C. The results are shown in FIG. 10.

Figure 10:
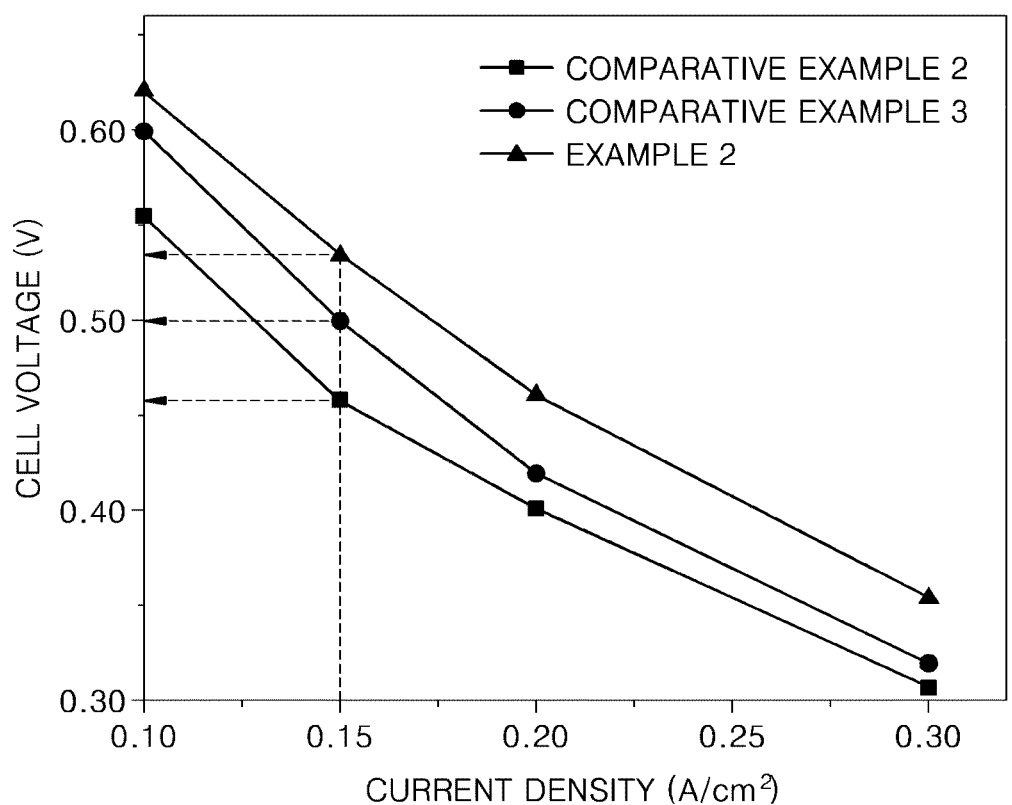
FIG. 10 is a graph showing current-voltage (I-V) characteristics of single cells using the catalysts manufactured in Example 2 and Comparative Examples 2-3.

Referring to FIG. 10, in view of the OCV that relates to an ORR onset potential, the ORR is high and performance of the MEA is improved in the fuel cell using the PdCoP—PdP/C catalyst manufactured in Example 2, as compared with the fuel cell using the electrode catalysts manufactured in Comparative Examples 2-3.

As described above, according to the one or more of the above exemplary embodiments of the present invention, the first catalyst alloy containing palladium (Pd), cobalt (Co), and phosphorus (P), and the second catalyst alloy containing palladium (Pd) and phosphorus (P) uniformly exist on the carbon-based support, so that the degree of alloying is higher than that of a general catalyst. Also, the particle size is small and thus, the ORR speed may be improved. Accordingly, the electrode catalyst may efficiently replace a currently used Pt electrode catalyst. Accordingly, a fuel cell having excellent electrochemical activity and price competitiveness may be manufactured.

It should be understood that the exemplary embodiments described herein should be considered in a descriptive sense only and not for purposes of limitation. Descriptions of features or aspects within each embodiment should typically be considered as available for other similar features or aspects in other embodiments.

What is claimed is:

1. An electrode catalyst for fuel cells, the electrode catalyst comprising:
 a carbon-based support; and
 catalytic particles supported by the carbon-based support, the catalytic particles comprising:
  a first catalyst alloy comprising palladium (Pd), cobalt (Co), and phosphorus (P); and
  a second catalyst alloy comprising palladium (Pd) and phosphorus (P).

2. The electrode catalyst of claim 1, wherein in the first catalyst alloy, the amount of cobalt is in a range of about 2 to about 13 weight %, and the amount of phosphorus is in a range of about 0.2 to about 1.5 weight %, based on the total weight of the first catalyst alloy.

3. The electrode catalyst of claim 1, wherein in the second catalyst alloy, the amount of phosphorus is in a range of about 0.2 to about 1.5 weight %, based on the total weight of the second catalyst alloy.

4. The electrode catalyst of claim 1, wherein the amount of the second catalyst alloy is in a range of about 20 to about 80 weight %, based on the total weight of the catalytic particles.

5. The electrode catalyst of claim 1, wherein the amount of the catalytic particles is in a range of about 20 to about 70 weight %, based on the total weight of the electrode catalyst.

6. The electrode catalyst of claim 1, wherein the carbon-based support comprises at least one selected from the group consisting of ketjen black, carbon black, graphite, carbon nanotubes, and carbon fiber.

7. The electrode catalyst of claim 1, wherein at least one of the first catalyst alloy and the second catalyst alloy further comprises at least one selected from the group consisting of iridium (Ir) and copper (Cu).

8. The electrode catalyst of claim 1, wherein the second catalyst alloy further comprises at least one selected from the group consisting of iridium (Ir) and copper (Cu).

* * * * *